US011355978B2

(12) United States Patent
Ichien et al.

(10) Patent No.: US 11,355,978 B2
(45) Date of Patent: Jun. 7, 2022

(54) ROTOR, MOTOR, AND ELECTRIC POWER STEERING DEVICE (71) Applicant: Nidec Corporation, Kyoto (JP)

(72) Inventors: Akira Ichien, Kyoto (JP); Hiroyuki Abe, Kyoto (JP); Hideyuki Kinjo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 156 days.

(21) Appl. No.: 16/646,178

(22) PCT Filed: Jul. 23, 2018

(86) PCT No.: PCT/JP2018/027516
§ 371 (c)(1),
(2) Date: Mar. 11, 2020

(87) PCT Pub. No.: WO2019/069539
PCT Pub. Date: Apr. 11, 2019

(65) Prior Publication Data
US 2020/0274408 A1    Aug. 27, 2020

Related U.S. Application Data (60) Provisional application No. 62/569,000, filed on Oct. 6, 2017.

(30) Foreign Application Priority Data

Mar. 30, 2018  (JP) .............................. JP2018-070047

(51) Int. Cl.
H02K 1/276        (2022.01)
B62D 5/04         (2006.01)

(52) U.S. Cl.
CPC ......... H02K 1/2773 (2013.01); B62D 5/0406 (2013.01)

(58) Field of Classification Search
CPC ........ H02K 1/2773; H02K 3/30; H02K 3/325; H02K 7/14; H02K 1/278; B62D 5/0406; B62D 5/0403
See application file for complete search history.

(56) References Cited

U.S. PATENT DOCUMENTS

| 6,414,413 B1* | 7/2002 | Arai ....................... H02K 3/325 |
|  |  | 310/214 |
| 7,687,957 B2* | 3/2010 | Ochiai ................... H02K 1/278 |
|  |  | 310/156.08 |
| 2016/0141930 A1* | 5/2016 | Kanazawa ............. H02K 15/03 |
|  |  | 310/156.01 |

FOREIGN PATENT DOCUMENTS

WO    2011/114574 A1    9/2011

* cited by examiner

Primary Examiner — Tulsidas C Patel
Assistant Examiner — Riley Owen Stout
(74) Attorney, Agent, or Firm — Keating & Bennett (57) ABSTRACT First and second sets of magnet assemblies and magnetic assemblies are alternately arranged in a circumferential direction in a first portion along an axial direction, and the first and second sets are alternately arranged in the circumferential direction in a second portion along the axial direction. When viewed in the axial direction, the first set of the first portion and the second set of the second portion overlap with each other, and the second set of the first portion and the first set of the second portion overlap with each other.

15 Claims, 8 Drawing Sheets

ROTOR, MOTOR, AND ELECTRIC POWER STEERING DEVICE

CROSS REFERENCE TO RELATED APPLICATIONS

This is a U.S. national stage of PCT Application No. PCT/JP2018/027516, filed on Jul. 23, 2018, and priority under 35 U.S.C. § 119(a) and 35 U.S.C. § 365(b) is claimed from U.S. Provisional Application No. 62/569,000, filed Oct. 6, 2017 and Japanese Application No. 2018-070047, filed on Mar. 30, 2018, the entire disclosures of each of which are hereby incorporated herein by reference.

1. FIELD

The present disclosure relates to a rotor, a motor, and an electric power steering device.

2. BACKGROUND

Typically, a motor includes a rotor and a stator. The rotor includes at least one magnet. To reduce a vibration and a noise generated by the motor, it is necessary to reduce both a cogging torque and a torque ripple.

Conventional motors reduce the cogging torque by providing protrusions or skews that generate phase inversion. The torque ripple is reduced by increasing a sine wave ratio of an induced voltage.

A countermeasure for the cogging torque is generally devised in such a manner as to apply the skew to generate an opposite phase. However, there is a problem in that the application of the skew causes torque reduction. Additionally, the cogging torque and the torque ripple have a trade-off relationship with respect to a skew angle, and both the cogging torque and the torque ripple are hardly reduced.

SUMMARY

According to an example embodiment of the present disclosure, a rotor includes a shaft including a center axis, a rotor core fixed to the shaft, and a magnet assembly and a magnetic assembly that are arranged side by side in a radial direction on a radial outside surface of the rotor core. A plurality of sets of the magnet assembly and the magnetic assembly are arrayed in a circumferential direction and an axial direction on the radial outside surface of the rotor core, the plurality of sets includes a first set in which the magnet assembly is disposed on the radial outside surface of the rotor core while the magnetic assembly is disposed on a radial outside surface of the magnet assembly, and a second set in which the magnetic assembly is disposed on the radial outside surface of the rotor core while the magnet assembly is disposed on the radial outside surface of the magnetic assembly, the first set and the second set are alternately arranged in the circumferential direction in a first portion along the axial direction on the radial outside surface of the rotor core, the first set and the second set are alternately arranged in the circumferential direction in a second portion different from the first portion along the axial direction on the radial outside surface of the rotor core, and when viewed in the axial direction, the first set of the first portion and the second set of the second portion overlap with each other, and the second set of the first portion and the first set of the second portion overlap with each other.

According to another example embodiment of the present disclosure, a motor includes the above-described rotor and a stator opposed to the rotor with a gap in a radial direction.

According to a further example embodiment of the present disclosure, an electric power steering device includes the above-described motor.

The above and other elements, features, steps, characteristics and advantages of the present disclosure will become more apparent from the following detailed description of the example embodiments with reference to the attached drawings.

DETAILED DESCRIPTION

In the following description, a direction parallel to a center axis J, namely, a vertical direction is simply referred to as an "axial direction", a radial direction centered on the center axis J is simply referred to as a "radial direction", and a circumferential direction centered on the center axis J is simply referred to as a "circumferential direction". In the following example embodiment, an upper side (+Z) corresponds to one side in the axial direction, and a lower side (−Z) corresponds to the other side in the axial direction. The vertical direction, the upper side, and the lower side are merely names for describing a relative positional relationship between the respective units, and an actual layout relationship and the like may be other than the layout relationship indicated by these names.

Figure 1:
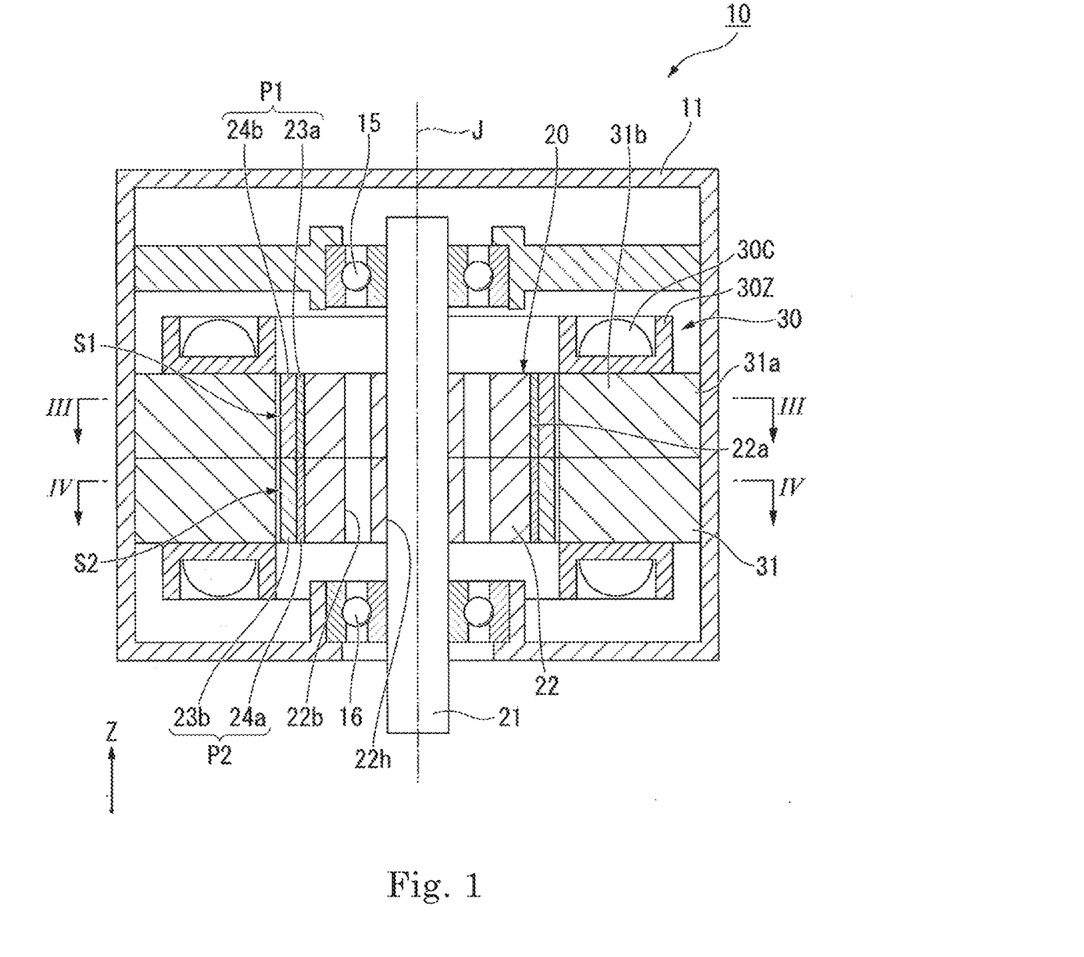
FIG. 1 is a schematic sectional view illustrating a rotor and a motor according to an example embodiment of the present disclosure.
Figure 2:
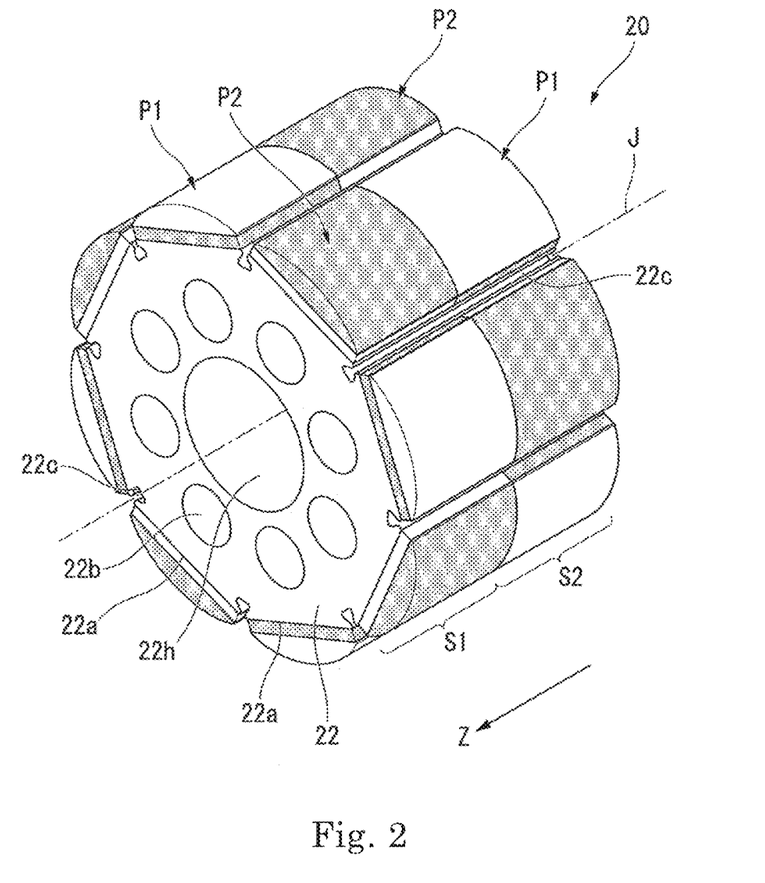
FIG. 2 is a perspective view of a rotor of an example embodiment of the present disclosure.

As illustrated in FIG. 1, a motor 10 of the example embodiment includes a rotor 20, a stator 30, a housing 11, and a plurality of bearings 15, 16. As illustrated in FIGS. 1 to 4, the rotor 20 includes a shaft 21 having the center axis J, a rotor core 22, a plurality of magnet units 23a, 23b, a plurality of magnetic units 24a, 24b, and a cover 25.

The shaft 21 extends vertically along the center axis J. In the example of the example embodiment, the shaft 21 has a columnar shape extending in the axial direction. The shaft 21 is supported by the plurality of bearings 15, 16 so as to be rotatable about the center axis J. The plurality of bearings 15, 16 are disposed at intervals in the axial direction, and are supported by the housing 11. The housing 11 has a tubular shape.

The shaft 21 is fixed to the rotor core 22 by press fitting, bonding, or the like. That is, the rotor core 22 is fixed to the shaft 21. The shaft 21 may be fixed to the rotor core 22 with a resin member or the like interposed therebetween. That is, the shaft 21 is directly or indirectly fixed to the rotor core 22. The shaft 21 is not limited to the above-mentioned cylindrical shape. For example, the shaft 21 may have a tubular shape.

For example, the rotor core 22 is a laminated steel sheet formed by laminating a plurality of electromagnetic steel sheets in the axial direction. The rotor core 22 has a tubular shape. The rotor core 22 has a polygonal outer shape when viewed in the axial direction (see FIG. 2). A radial outside surface of the rotor core 22 includes a plurality of flat surfaces 22a arranged in the circumferential direction. In the example of the example embodiment, the rotor core 22 has an octagonal outer shape. The radial outside surface of the rotor core 22 includes eight flat surfaces 22a arranged in the circumferential direction. The flat surface 22a has a flat shape extending in a direction perpendicular to the radial direction. The flat surface 22a extends in the axial direction in the radial outside surface of the rotor core 22. The flat surfaces 22a are arranged on the radial outside surface of the rotor core 22 over the entire length in the axial direction. In the example of the example embodiment, an axial length of the flat surface 22a is larger than a circumferential length.

The rotor core 22 includes a through-hole 22h, a hole 22b, and a groove 22c. When viewed in the axial direction, the through-hole 22h is disposed in a center portion of the rotor core 22. The through-hole 22h penetrates the rotor core 22 in the axial direction. The shaft 21 is inserted into the through-hole 22h.

The hole 22b penetrates the rotor core 22 in the axial direction. The plurality of holes 22b are made in the rotor core 22 at intervals in the circumferential direction. In the example of the example embodiment, the holes 22b are arranged in the rotor core 22 at equal intervals in the circumferential direction. When viewed in the axial direction, the hole 22b has a circular shape. In the example embodiment, the rotor core 22 is lightened by the hole 22b, so that weight reduction and cost reduction of a material of the rotor core 22 can be achieved.

The groove 22c is recessed radially inward from the radial outside surface of the rotor core 22, and extends in the axial direction. The groove 22c is disposed over the entire length in the axial direction on the radial outside surface of the rotor core 22. The groove 22c is disposed between a pair of circumferentially adjacent flat surfaces 22a on the radial outside surface of the rotor core 22, and is open onto a radial outside. A plurality of grooves 22c are arranged on rotor core 22 at intervals in the circumferential direction. The grooves 22c are arranged on the rotor core 22 at equal intervals in the circumferential direction. A groove width of the groove 22c becomes smaller toward the radial outside. When viewed in the axial direction, the groove 22c has a wedge shape.

Figure 3:
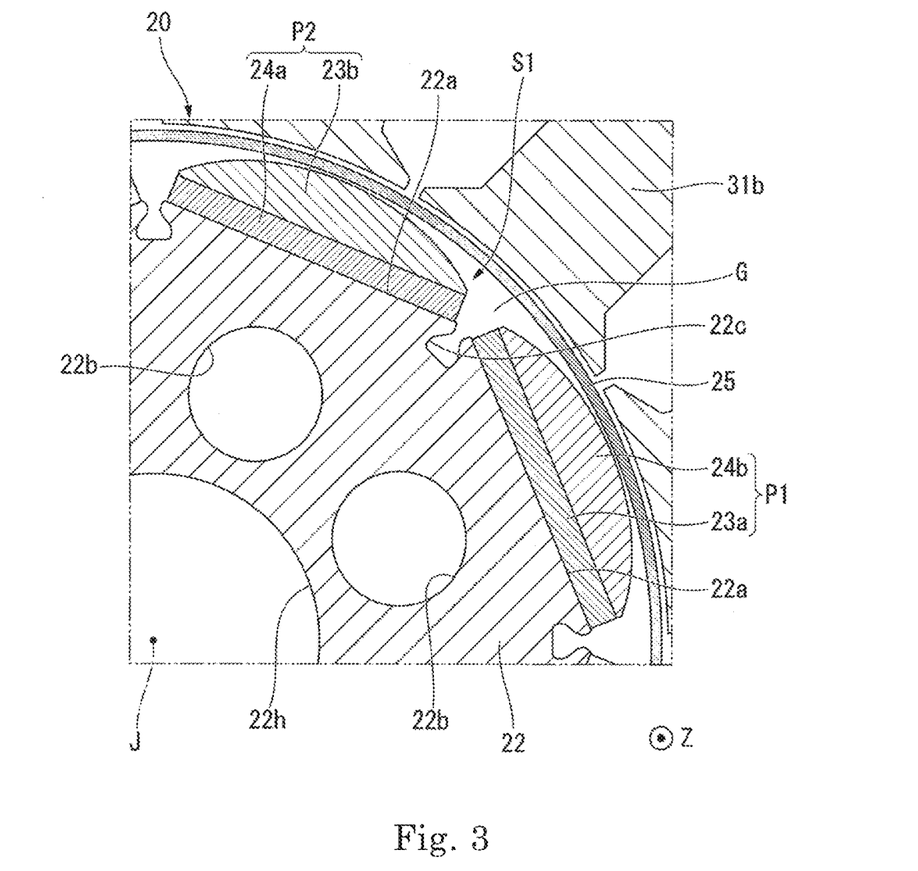
FIG. 3 is an enlarged sectional view illustrating a portion of a section taken along a line III-III in FIG. 1.
Figure 4:
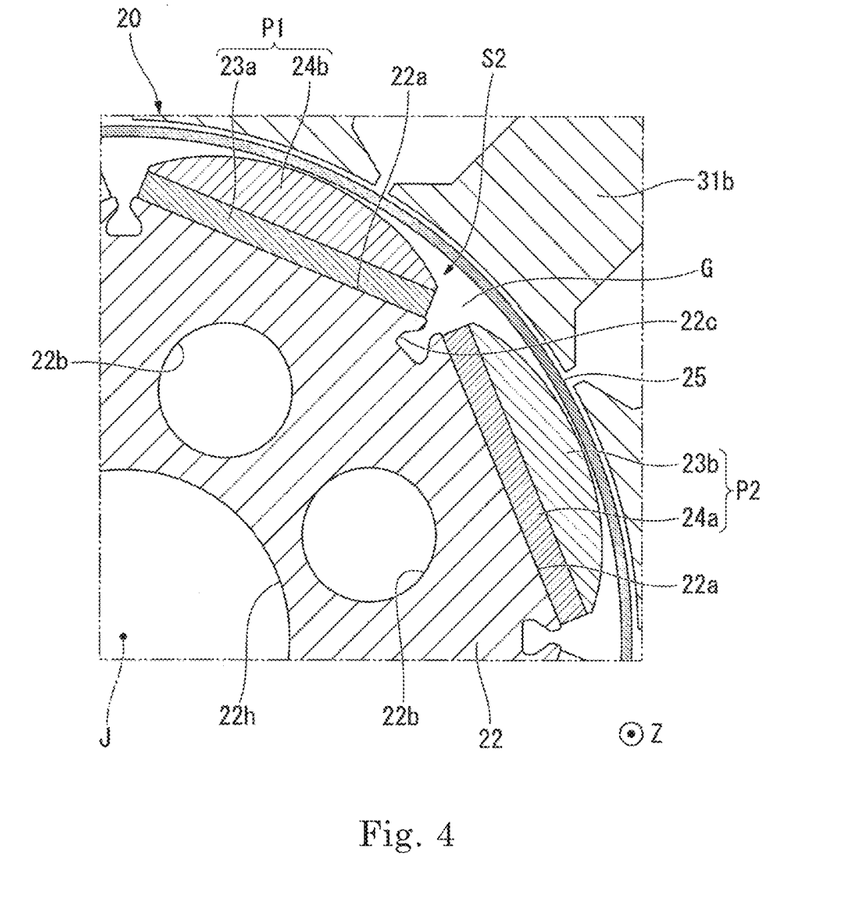
FIG. 4 is an enlarged sectional view illustrating a portion of a section taken along a line IV-IV in FIG. 1.

The magnet units 23a, 23b are permanent magnets. The magnetic units 24a, 24b are made of a magnetic material (ferromagnetic material) such as iron, stainless steel, and steel. As illustrated in FIGS. 3 and 4, the magnet units 23a, 23b and the magnetic units 24a, 24b are radially provided side by side on the radial outside surface of the rotor core 22. The magnet units 23a, 23b and the magnetic units 24a, 24b are provided on the flat surface 22a so as to overlap each other in the radial direction. When viewed in a sectional view perpendicular to the center axis J, the magnet units 23a, 23b and the magnetic units 24a, 24b are provided one by one (two in total) in the flat surface 22a so as to be laminated in the radial direction.

A plurality of sets P1, P2 of the magnet units 23a, 23b and the magnetic units 24a, 24b arranged in the radial direction are arrayed in the circumferential direction and the axial direction on the radial outside surfaces of the rotor core 22. In the example of the example embodiment, the sets P1, P2 arrayed in the axial direction are arranged without any gap in the axial direction. The sets P1, P2 arrayed in the circumferential direction are arranged at intervals in the circumferential direction. The groove 22c is disposed between the pair of circumferentially adjacent sets P1, P2.

The plurality of sets P1, P2 include a first set P1 and a second set P2. In the first set P1, the magnet unit 23a is disposed on the radial outside surface of the rotor core 22, and the magnetic unit 24b is disposed on the radial outside surface of the magnet unit 23a. That is, the first set P1 includes the magnet unit 23a and the magnetic unit 24b such that the magnet unit 23a and the magnetic unit 24b are disposed in this order from the flat surface 22a toward the radial outside. The magnet unit 23a of the first set P1 is covered from the radial outside with the magnetic unit 24b. The magnet unit 23a is disposed on a radial inside in the first set P1. For example, the magnet unit 23a can be referred to as an Interior Permanent Magnet (IPM).

In the second set P2, the magnetic unit 24a is disposed on the radial outside surface of the rotor core 22, and the magnet unit 23b is disposed on the radial outside surface of the magnetic unit 24a. That is, the second set P2 includes the magnetic unit 24a and the magnet unit 23b such that the magnetic unit 24a and the magnet unit 23b are disposed in this order from the flat surface 22a toward the radial outside. The magnet unit 23b is disposed on the radial outside in the second set P2. For example, the magnet unit 23b can be referred to as a Surface Permanent Magnet (SPM).

In the example of the example embodiment, the shape of the magnet unit 23a of the first set P1 and the shape of the magnetic unit 24a of the second set P2 are identical to each other. The shape of the magnetic unit 24b of the first set P1 and the shape of the magnet unit 23b of the second set P2 are identical to each other.

Each of the magnet unit 23a and the magnetic unit 24a has a plate shape. The magnet unit 23a and the magnetic unit 24a have a quadrangular plate shape. As illustrated in FIGS. 3 and 4, when viewed in the axial direction, each of the magnet unit 23a of the first set P1 and the magnetic unit 24a of the second set P2 has a circumferential length longer than a radial length. Each of the radial inside surface and the radial outside surface of the magnet unit 23a has the flat shape extending in the direction perpendicular to the radial direction. Each of the radial inside surface and the radial outside surface of the magnetic unit 24a has the flat shape extending in the direction perpendicular to the radial direction.

Each of the magnet unit 23b and the magnetic unit 24b has a plate shape. When viewed from the radial direction, the magnet unit 23b and the magnetic unit 24b have a quadrangular shape. Radial thicknesses of the magnet unit 23b and the magnetic unit 24b increase from both ends in the circumferential direction toward the central side (circumferential inside). When viewed in the axial direction, each of the magnetic unit 24b of the first set P1 and the magnet unit 23b of the second set P2 includes the linear radial inside surface and the convex radial outside surface. The radial inside surface of the magnetic unit 24b is the flat shape extending in the direction perpendicular to the radial direction. The radial outside surface of the magnetic unit 24b has a curved surface that is convex to the radial outside when viewed in the axial direction. The radial inside surface of the magnet unit 23b has the flat shape extending in the direction perpendicular to the radial direction. The radial outside surface of the magnet unit 23b has a curved shape that is convex to the radial outside when viewed in the axial direction. When viewed in the axial direction, the magnetic unit 24b and the magnet unit 23b has a substantially D-shape.

In the example of the example embodiment, in the first set P1, both ends in the circumferential direction of the magnet unit 23a and both ends in the circumferential direction of the magnetic unit 24b are disposed so as to overlap each other when viewed from the radial direction. That is, the circumferential positions at both ends in the circumferential direction of the magnet unit 23a are the same as the circumferential positions at both ends in the circumferential direction of the magnetic unit 24b. Both the ends in the circumferential direction of each of the magnet unit 23a and the magnetic unit 24b (that is, the first set P1) and both the ends in the circumferential direction of the flat surface 22a are disposed so as to overlap each other when viewed from the radial direction. In the illustrated example, the circumferential positions at both the ends in the circumferential direction of the flat surface 22a are slightly disposed on the circumferential outside than the circumferential positions at both the ends in the circumferential direction of the first set P1. That is, the circumferential length of the flat surface 22a is longer than the circumferential length of the first set P1.

In the second set P2, both the ends in the circumferential direction of the magnetic unit 24a and both the ends in the circumferential direction of the magnet unit 23b are disposed so as to overlap each other when viewed from the radial direction. That is, the circumferential positions at both the ends in the circumferential direction of the magnetic unit 24a are the same as the circumferential positions at both the ends in the circumferential direction of the magnet unit 23b. Both the ends in the circumferential direction of each of the magnetic unit 24a and the magnet unit 23b (that is, the second set P2) and both the ends in the circumferential direction of the flat surface 22a are disposed so as to overlap each other when viewed from the radial direction. In the illustrated example, the circumferential positions at both the ends in the circumferential direction of the flat surface 22a are slightly disposed on the circumferential outside than the circumferential positions at both the ends in the circumferential direction of the second set P2. That is, the circumferential length of the flat surface 22a is longer than the circumferential length of the second set P2.

A volume of the magnet unit 23a of the first set P1 is equal to a volume of the magnetic unit 24a of the second set P2. The volume of the magnetic unit 24b of the first set P1 is equal to the volume of the magnet unit 23b of the second set P2. In the example embodiment, the shape, characteristics, and the like of the first set P1 (the magnet unit 23a and the magnetic unit 24b) and the shape, characteristics, and the like of the second set P2 (the magnetic unit 24a and the magnet unit 23b) can be equalized. Consequently, the effect (to be described later) of the example embodiment can more stably be obtained.

In a first portion (first step, first region) S1 along the axial direction on the radial outside surface of the rotor core 22, the first set P1 and the second set P2 are alternately arranged in the circumferential direction. In the first portion S1, pluralities of sets P1, P2 are arranged at equal intervals in the circumferential direction on the radial outside surface of the rotor core 22. In a second portion (second step, second region) S2 different from the first portion S1 along the axial direction on the radial outside surface of the rotor core 22, the first set P1 and the second set P2 are alternately arranged in the circumferential direction. In the second portion S2, pluralities of sets P1, P2 are arranged at equal intervals in the circumferential direction on the radial outside surface of the rotor core 22.

When viewed in the axial direction, the first set P1 of the first portion S1 and the second set P2 of the second portion S2 are disposed so as to overlap each other. When viewed in the axial direction, the second set P2 of the first portion S1 and the first set P1 of the second portion S2 are disposed so as to overlap each other. In the example embodiment, when viewed in the axial direction, the center portion in the circumferential direction of the first set P1 of the first portion S1 and the center portion in the circumferential direction of the second set P2 of the second portion S2 are disposed so as to overlap each other, and the center portion in the circumferential direction of the second set P2 of the first portion S1 and the center portion in the circumferential direction of the first set P1 of the second portion S2 are disposed so as to overlap each other. When viewed in the axial direction, both the ends in the circumferential direction of the first set P1 of the first portion S1 and both the ends in the circumferential direction of the second set P2 of the second portion S2 are disposed so as to overlap each other, and both the ends in the circumferential direction of the second set P2 of the first portion S1 and both the ends in the circumferential direction of the first set P1 of the second portion S2 are disposed so as to overlap each other. For this reason, the skew is not applied to the magnet units 23a, 23b, and the magnet units 23a and 23b are arrayed straight in the axial direction.

Figure 5:
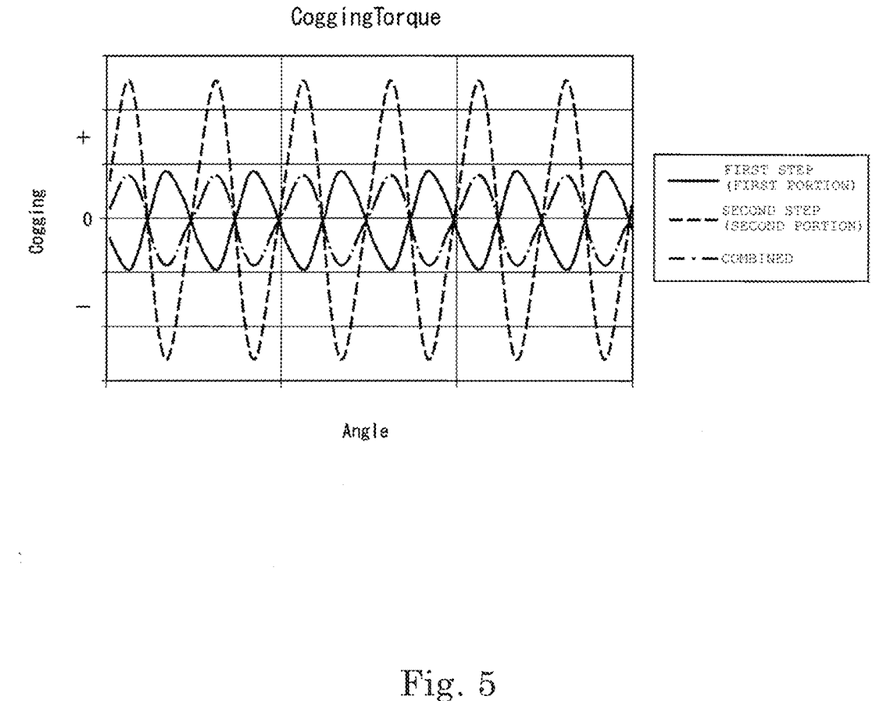
FIG. 5 is a graph illustrating a waveform of cogging torque of a motor of an example embodiment of the present disclosure.
Figure 6:
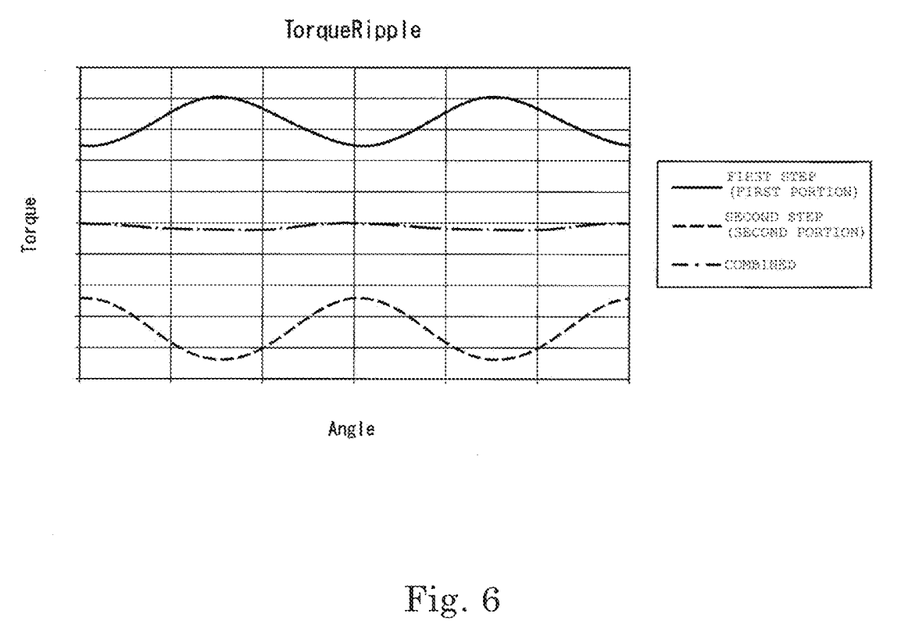
FIG. 6 is a graph illustrating a waveform of a torque ripple of a motor of an example embodiment of the present disclosure.

FIG. 5 is a graph illustrating a cogging torque waveform of the motor 10 including the rotor 20 of the example embodiment. FIG. 6 is a graph illustrating a torque ripple waveform of the motor 10 of the example embodiment. As illustrated in FIG. 5 and FIG. 6, in the example embodiment, the opposite phase can be generated in the cogging torque without applying skew to the magnet units 23a, 23b. That is, because the cogging torque generated in the first portion S1 and the cogging torque generated in the second portion S2 are generated with phases opposite to each other, the cogging torque generated in the first portion S1 and the cogging torque generated in the second portion S2 cancel each other, and a fluctuation range of a combined cogging torque waveform (a difference between a maximum value and a minimum value of the combined cogging torque) can be kept small. The opposite phase can be generated in the torque ripple. That is, because the torque ripple generated in the first portion S1 and the torque ripple generated in the second portion S2 are generated with phases opposite to each other, the torque ripple generated in the first portion S1 and the torque ripple generated in the second portion S2 cancel each other, and a fluctuation range of a combined torque ripple waveform (the difference between the maximum value and the minimum value of the combined torque ripple) can be kept small. Thus, in the example embodiment, the cogging torque can be reduced while the torque reduction is prevented, and the torque ripple can be reduced. The vibration and noise generated by the motor 10 can be reduced.

When the magnet units 23a, 23b and the magnetic units 24a, 24b are disposed in the radial direction, a usage amount of the magnet (permanent magnet) can be decreased while the torque reduction is prevented. Specifically, for example, the usage amount of the magnet unit of a configuration (hereinafter, referred to as a reference example) in which a plurality of magnet units (not illustrated) each of which has the same volume as a sum of the volume of the magnet unit 23a (23b) per one set P1 (P2) and the volume of the magnetic unit 24b (24a) per one set P1 (P2) are arrayed on the radial outside surface of the rotor core 22 and the usage amount of the magnet in the example embodiment will be compared to each other. In this case, as compared with the reference example, in the example embodiment, the usage amount of the magnet can be decreased to about a half while the torque reduction is suppressed to about 20%, for example. In other words, the usage amount of the magnet used can be reduced without reducing the torque. Generally a ratio of cost of the magnet to cost of the entire rotor 20 is high, and therefore the cost of the entire rotor 20 can easily be reduced in the example embodiment.

In the example embodiment, the same numbers of first portions S1 and second portions S2 are alternately arranged in the axial direction on the radial outside surface of the rotor core 22. That is, the sum of the number of the first portions S1 and the number of the second portions S2 becomes an even number, and the first portions S1 and the second portions S2 are alternately arranged in the axial direction. Consequently, the above effect that can reduce the cogging torque and the torque ripple can more stably be obtained. In the example of the example embodiment, the first portion S1 and the second portion S2 are arranged in the axial direction on the radial outside surface of the rotor core 22. Thus, the above effect can be obtained with a simple structure.

The cover 25 has a tubular shape centered on the center axis J. In the example of the example embodiment, the cover 25 has a cylindrical shape. The cover 25 surrounds the rotor core 22, the magnet units 23a, 23b, and the magnetic units 24a, 24b from the radial outside. An inner circumferential surface of the cover 25 and the radial outside end of the first set P1 are in contact with each other, or are opposed to each other with a gap interposed therebetween. Specifically, the inner circumferential surface of the cover 25 and the center portion in the circumferential direction of the radial outside surface of the first set P1 are in contact with each other, or are opposed to each other with a gap interposed therebetween. The inner circumferential surface of the cover 25 and the radial outside end of the second set P2 are in contact with each other, or are opposed to each other with a gap interposed therebetween. Specifically, the inner circumferential surface of the cover 25 and the center portion in the circumferential direction of the radial outside surface of the second set P2 are in contact with each other, or are opposed to each other with a gap interposed therebetween. The rotor core 22, the magnet units 23a, 23b, and the magnetic units 24a, 24b are disposed with an air gap (void) G in the radial direction between the rotor core 22 and the inner circumferential surface of the cover 25. In the example embodiment, even when the magnet units 23a, 23b and the magnetic units 24a, 24b are laminated in the radial direction on the radial outside surface of the rotor core 22, the cover 25 can prevent the movement onto the radial outside of the magnet units 23a, 23b and the magnetic units 24a, 24b. Air gap G between the rotor core 22, the magnet units 23a, 23b, and the magnetic units 24a, 24b and the cover 25 may be filled with resin.

Figure 7:
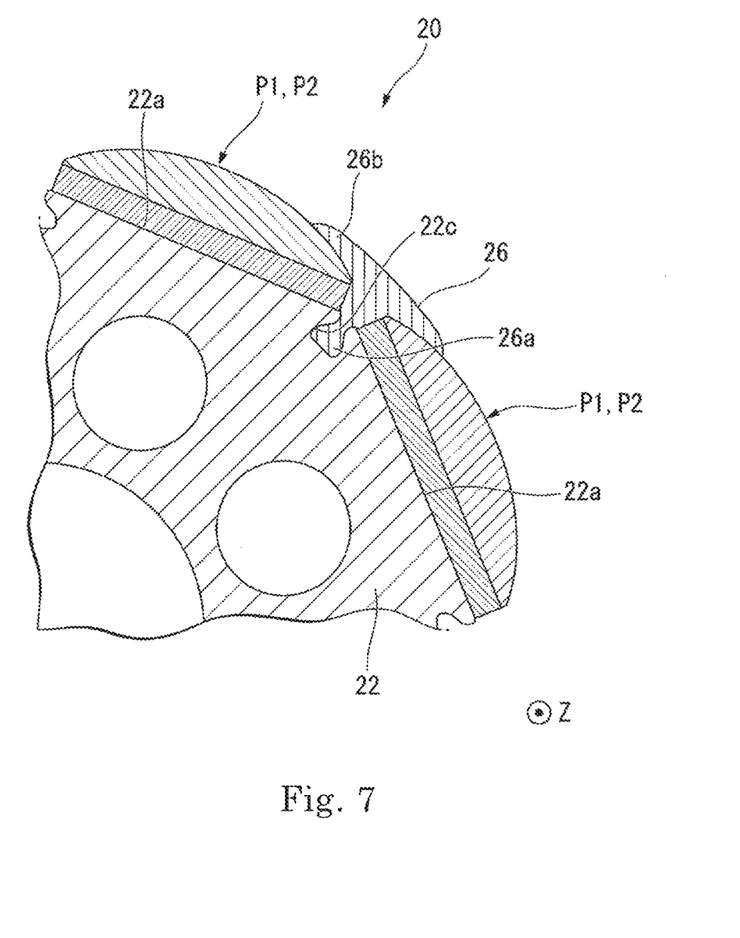
FIG. 7 is an enlarged sectional view illustrating a portion of a rotor according to a modification of an example embodiment of the present disclosure.

FIG. 7 illustrates a modification of the rotor 20 of the example embodiment. The rotor 20 includes a resin mold 26 instead of or together with the cover 25. The resin mold 26 is provided on the radial outside surface of the rotor core 22. A plurality of resin molds 26 are disposed at intervals in the circumferential direction on the radial outside surface of the rotor core 22. The resin mold 26 extends along the groove 22c. The resin mold 26 is formed by insert-molding and solidifying a molten resin together with the rotor core 22.

The resin mold 26 includes an anchor 26a and a movement prevention unit 26b. The groove 22c is filled with the molten resin and solidified, thereby forming the anchor 26a. The anchor 26a extends in the axial direction. A circumferential width of the anchor 26a increases toward the radial inside. The movement prevention unit 26b is located on the radial outside of the anchor 26a, and connected to the anchor 26a. The movement prevention unit 26b is disposed at the radial outside end of the resin mold 26. The movement prevention unit 26b protrudes from the anchor 26a toward both circumferential sides (one side and the other side). The movement prevention unit 26b has a plate shape in which a plate surface faces to the radial direction. The movement prevention unit 26b extends in the axial direction. The movement prevention unit 26b is disposed at a space from the flat surface 22a on the radial outside of the flat surface 22a. When viewed from the radial direction, the movement prevention unit 26b and the flat surface 22a are disposed so as to overlap each other.

After forming the resin mold 26, the sets P1, P2 are inserted between the flat surface 22a and the movement prevention unit 26b. For example the sets P1, P2 are press-fitted between the flat surface 22a and the movement prevention unit 26b. In the example embodiment, the resin mold 26 can function by providing the wedge-shaped groove 22c on the radial outside surface of the rotor core 22. That is, the resin mold 26 that is prevented from coming radially off from the groove 22c can be provided. The magnet units 23a, 23b and the magnetic units 24a, 24b can be pressed from the radial outside by the resin mold 26, and the movement onto the radial outside of the magnet units 23a, 23b and the magnetic units 24a, 24b can be prevented.

As illustrated in FIG. 1, the stator 30 includes a stator core 31, an insulator 30Z, and a plurality of coils 30C. The stator core 31 has the annular shape centered on the center axis J. The stator core 31 surrounds the rotor 20 on the radial outside of the rotor 20. The stator core 31 is radially opposed to the rotor 20 with a gap interposed therebetween. That is, the stator 30 is radially opposed to the rotor 20 with the gap interposed therebetween. For example, the stator core 31 is formed of a laminated steel plate in which a plurality of electromagnetic steel plates are laminated in the axial direction.

Specifically, the stator core 31 includes a substantially annular core back 31a and a plurality of teeth 31b. In the example embodiment, the core back 31a has an annular shape centered on the center axis J. The tooth 31b extends from the radial inside surface of the core back 31a toward the radial inside. The outer circumferential surface of the core back 31a is fixed to the inner circumferential surface of a circumferential wall of the housing 11. The plurality of teeth 31b are arranged at intervals in the circumferential direction on the radial inside surface of the core back 31a. In the example embodiment, the teeth 31b are arranged at regular intervals in the circumferential direction.

The insulator 30Z is attached to the stator core 31. The insulator 30Z includes a portion covering the teeth 31b. For example, an insulating material such as a resin is used as a material for the insulator 30Z.

The coil 30C is attached to stator core 31. The plurality of coils 30C are attached to the stator core 31 with the insulator 30Z interposed therebetween. A conductive wire is wound around each tooth 31b with the insulator 30Z interposed therebetween, thereby forming the plurality of coils 30C.

An example of a device on which the motor 10 of the example embodiment is mounted will be described below. An example in which the motor 10 is mounted on an electric power steering device will be described in the example embodiment.

Figure 8:
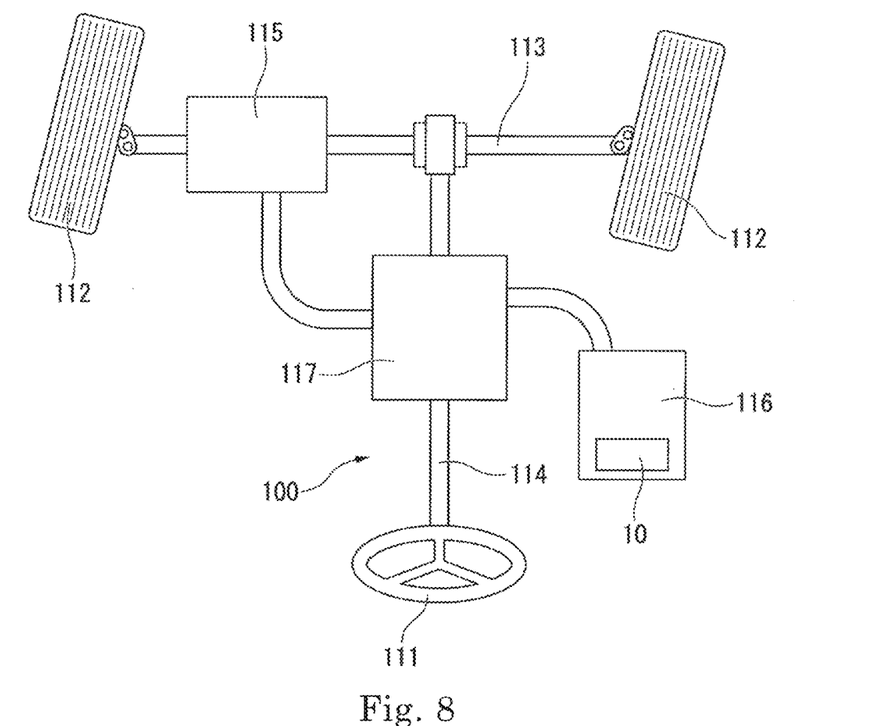
FIG. 8 is a schematic diagram illustrating an electric power steering device of an example embodiment of the present disclosure.

As illustrated in FIG. 8, an electric power steering device 100 is mounted on a steering mechanism of a wheel of an automobile. The electric power steering device 100 is a device that reduces steering force by a hydraulic pressure. The electric power steering device 100 of the example embodiment includes the motor 10, a steering axle 114, an oil pump 116, and a control valve 117.

The steering axle 114 transmits input from the steering 111 to an axle 113 including wheels 112. The oil pump 116 generates the hydraulic pressure in a power cylinder 115 that transmits driving force of the hydraulic pressure to the axle 113. The control valve 117 controls the oil of the oil pump 116. In the electric power steering device 100, the motor 10 is mounted as a drive source of the oil pump 116.

The electric power steering device 100 of the example embodiment includes the motor 10 of the example embodiment. For this reason, the electric power steering device 100 that obtains the same effect as the motor 10 can be obtained.

The present disclosure is not limited to the above example embodiment. For example, as will be described below, the configuration or the like can be changed without departing from the scope of the present disclosure.

The shapes of the magnet units 23a, 23b and the shapes of the magnetic units 24a, 24b are not limited to the examples described in the above example embodiment. The volume of the magnet unit 23a of the first set P1 and the volume of the magnet unit 23b of the second set P2 may be different from each other. The volume of the magnetic unit 24b of the first set P1 and the volume of the magnetic unit 24a of the second set P2 may be different from each other.

Instead of or while providing the cover 25 and the resin mold 26 on the rotor 20, the flat surface 22a, the magnet units 23a, 23b, and the magnetic units 24a, 24b that are in contact with one another in the radial direction may be fixed to one another by bonding or the like.

In the above example embodiment, the rotor core 22 and the magnetic units 24a, 24b are provided in the rotor 20 as members different from each other. However, the present disclosure is not limited to this configuration. The rotor core 22 and the magnetic units 24a, 24b may be a single member. Further, the magnet unit 23a may be embedded in the magnetic unit 24b provided integrally with the rotor core 22. In this case, the cover 25 may surround the second set P2 from the radial outside. Consequently, in the second set P2, the magnet unit 23b can be prevented from coming off.

Although the example in which the motor 10 is mounted on the electric power steering device 100 is described in the above example embodiment, the present disclosure is not limited to this configuration. The motor 10 can be used for various devices such as a pump, a brake, a clutch, a vacuum cleaner, a dryer, a sealing fan, a washing machine, and a refrigerator.

Without departing from the scope of the present disclosure, the configurations (components) described in the above example embodiments, modifications, and explanatory notes may be combined, and additions, omissions, substitutions, and other changes of the configurations can be made. The present disclosure is not limited by the above example embodiments, but is limited only by the scope of the claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
   a shaft including a center axis;
   a rotor core fixed to the shaft; and
   a magnet assembly and a magnetic assembly that are arranged side by side in a radial direction on a radial outside surface of the rotor core; wherein
   a plurality of sets of the magnet assembly and the magnetic assembly are arrayed in a circumferential direction and an axial direction on the radial outside surface of the rotor core;
   the plurality of sets includes:
   a first set in which the magnet assembly is disposed on the radial outside surface of the rotor core and the magnetic assembly is disposed on a radial outside surface of the magnet assembly; and
   a second set in which the magnetic assembly is disposed on the radial outside surface of the rotor core and the magnet assembly is disposed on a radial outside surface of the magnetic assembly;
   the first set and the second set are alternately arranged in the circumferential direction in a first portion along the axial direction on the radial outside surface of the rotor core;
   the first set and the second set are alternately arranged in the circumferential direction in a second portion different from the first portion along the axial direction on the radial outside surface of the rotor core; and
   when viewed in the axial direction, the first set of the first portion and the second set of the second portion overlap with each other, and the second set of the first portion and the first set of the second portion overlap with each other.

2. The rotor according to claim 1, wherein when viewed in the axial direction:
   a center portion in the circumferential direction of the first set of the first portion and a center portion in the circumferential direction of the second set of the second portion overlap each other; and
   a center portion in the circumferential direction of the second set of the first portion and a center portion in the circumferential direction of the first set of the second portion overlap each other.

3. The rotor according to claim 1, wherein when viewed in the axial direction:
   both ends in the circumferential direction of the first set of the first portion and both ends in the circumferential direction of the second set of the second portion overlap each other; and
   both ends in the circumferential direction of the second set of the first portion and both ends in the circumferential direction of the first set of the second portion overlap each other.

4. The rotor according to claim 1, wherein identical numbers of the first portions and the second portions are alternately arranged in the axial direction on the radial outside surface of the rotor core.

5. The rotor according to claim 4, wherein the first portion and the second portion are axially arranged one by one on the radial outside surface of the rotor core.

6. The rotor according to claim 1, wherein
a shape of the magnet assembly of the first set and a shape of the magnetic assembly of the second set are identical to each other; and
a shape of the magnetic assembly of the first set and a shape of the magnet assembly of the second set are identical to each other.

7. The rotor according to claim 6, wherein when viewed in the axial direction:
each of the magnet assembly of the first set and the magnetic assembly of the second set has a rectangular shape having a circumferential length longer than a radial length; and
each of the magnetic assembly of the first set and the magnet assembly of the second set includes a radial inside surface having a linear shape and the radial outside surface having a convex curved shape.

8. The rotor according to claim 6, wherein
a volume of the magnet assembly of the first set and a volume of the magnetic assembly of the second set are equal to each other; and
a volume of the magnetic assembly of the first set and a volume of the magnet assembly of the second set are equal to each other.

9. The rotor according to claim 1, wherein the rotor core includes a hole penetrating the rotor core in the axial direction.

10. The rotor according to claim 9, wherein a plurality of the holes are arranged at intervals in the circumferential direction in the rotor core.

11. The rotor according to claim 1, wherein
the rotor core includes a groove, which is recessed from the radial outside surface of the rotor core toward a radial inside and extends in the axial direction; and
the groove is disposed between a pair of circumferentially adjacent sets and is open to a radial outside, and a groove width decreases toward the radial outside.

12. The rotor according to claim 1, further comprising a cover that surrounds the rotor core, the magnet assembly, and the magnetic assembly from the radial outside.

13. The rotor according to claim 12, wherein the cover surrounds the second set from the radial outside.

14. A motor comprising:
the rotor according to claim 1; and
a stator opposed to the rotor with a gap in a radial direction.

15. An electric power steering device comprising the motor according to claim 14.

\* \* \* \* \*